Sept. 4, 1945. V. W. SHERMAN 2,383,992
INDUCTION HEATING APPARATUS AND FLUX FIELD CONTROL THEREOF
Filed Feb. 25, 1943

INVENTOR.
VERNON W. SHERMAN
BY
ATTORNEY

Patented Sept. 4, 1945

2,383,992

UNITED STATES PATENT OFFICE 2,383,992

INDUCTION HEATING APPARATUS AND FLUX FIELD CONTROL THEREOF

Vernon W. Sherman, Summit, N. J., assignor to Federal Telephone & Radio Corporation, New York, N. Y., a corporation of Delaware Application February 25, 1943, Serial No. 477,085

4 Claims. (Cl. 219—13)

This invention relates to an improved apparatus and method of controlling the flux lines of a field of an induction coil for high frequency induction heating of articles of non-uniform cross-sectional area so as to obtain a more uniform hardening of such irregular shapes than would occur with the employment of the symmetrical induction heating coil alone, as is customary.

An object thereof is to produce in the hardening of irregular shapes a controlled compensating effect in the primary flux field to rectify irregularities in the heating of the work as may occur incident to changes in cross-section. These irregularities result from increase of heat conduction in the portions of greater section and to a degree by deviations in the primary flux field incident to the varied counter magnetomotive forces incident to the variables produced by the change of cross-section. The controlling effect aforesaid is proportioned to compensate for the variables whereby the resultant path of the flux lines may produce a more uniform surface hardening or of such controlled depth as may be desired.

As an example of the practical application of the present invention to a typical production problem, the surface hardening of a bearing shaft of uniform diameter may be considered but wherein the shaft at one end thereof is formed with a centrally positioned bore extending a short distance longitudinally within the shaft body thereby providing a work piece of full cross-sectional area part way of its length and with a substantially reduced cross-section area for its remainder and in the region of the bore. It has been found that as a result of the greater heat conduction from the surface of the major section plus its influence upon the field of magnetic flux, at this region of the greater cross-sectional area the surface hardening occurs to a lesser depth than that occurring in that portion of the shaft of lesser cross-sectional area and having reduced heat conduction.

To compensate for this non-uniform depth of hardening there is provided at the region of the greater area of the work piece a supplemental, control or compensating coil wherein a current is induced, the field of which influences the path of the flux of the primary heating coil to the end that the resultant path of flux will be such as to increase the depth of heating and consequent hardness of the greater cross-sectional area portion of the work piece.

The present improvements further include the provision of means for producing an adjustable impedance in the supplemental or compensating coil circuit to permit varying its distortion of the primary heating field incident to variations of current flow of the compensating coil circuit and altered phase relation to that of the heating coil. This adjustment correspondingly determines the character and degree of its influence on the heating coil. There may further desirably be incorporated therewith additional compensating or shading coil arrangements positioned adjacent the end portion of the work piece to be treated to have a corrective close coupling influence at the extremity of the work piece where distortion of the flux lines of the usual induction heating field commonly occur.

The features and characteristics of the present invention are illustrated diagrammatically in the drawing herewith wherein like reference characters are applied to the corresponding parts in the several views.

Figure 1:
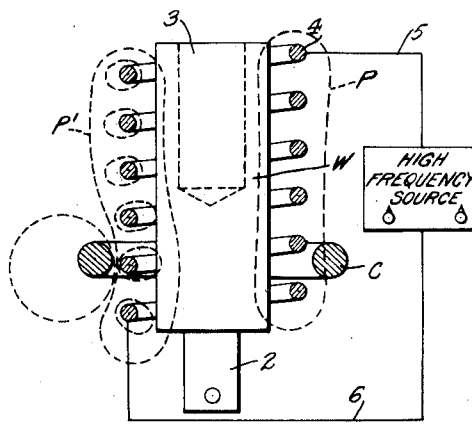
Fig. 1 shows, diagrammatically, a high frequency induction heating apparatus having flux directing or compensating means of the present invention and wherein the primary induction coil and corrective or compensating coil are shown in section.

An improved embodiment of the present invention is shown diagrammatically in Figure 1 wherein the improved arrangement is employed to effect the surface hardening of an irregular work piece indicated at W which as shown is a cylindrical bearing shaft of substantially uniform diameter throughout its length, having a reduced lower end portion 2 and having its upper portion provided with a longitudinally extending opening or bore 3 extending internally of the shaft to about its mid-section. This is shown as a typical example of a production problem wherein it is desired to surface harden the bearing surface by the instrumentality of a heating coil employing high frequency current and wherein the work piece is of non-uniform cross-sectional area. The non-uniform cross-section, as is readily understood, occasions unequal heat conduction within the work and operates to generate counter magnetomotive forces of varied intensity and direction and which ordinarily would result in non-uniform depth of the heating and hardening action. In the illustrated instance, with the employment alone of the usual single heating coil, an undesirable variation in the depth of the hardening occurs and wherein the heating or hardening of the lower portion, of solid cross-sectional area is of substantially lesser depth than the heating and resultant hardening of the upper portion of reduced cross-sectional area over the bore.

The heating coil is here shown at 4 in operative position surrounding the work piece W and is connected in series with the leads 5 and 6 of a high frequency circuit connected to a high frequency generating source, as indicated. As a corrective for the non-uniform path of the magnetic field resulting from the non-uniform cross-section of the work there is provided, in accordance with the present invention and as shown in Fig. 1, a ring C of high electric conductivity metal spaced from and surrounding the primary heating coil 4. The ring is positioned to be substantially in the transverse plane corresponding with a point centrally of the length of the solid portion of the work piece as illustrated. This ring, by reason of induced current therein and the effect of its flux on the primary coil field, forces additional concentration of flux where wanted to provide additional heat to compensate for higher heat conduction losses in the solid portion of the work piece. The effect of the induced or compensating current in the compensating coil C is determined by the ring proportions and spacing relation to obtain the desired corrective action as is required to compensate for the variation of heat conduction and to variation in the normal path of the flux incident to the specific alteration in the cross-sectional area of the work.

In Figure 1, at the right hand side thereof is shown in dotted lines indicated at P an approximation of normal flow lines of flux incident to excitation of the heating coil 4 alone and uninfluenced by the secondary compensating coil C. At the left hand side thereof there is similarly indicated at P' an approximation of the flow path of the magnetic field as influenced and corrected by the presence of the compensating ring circuit.

Figure 2:
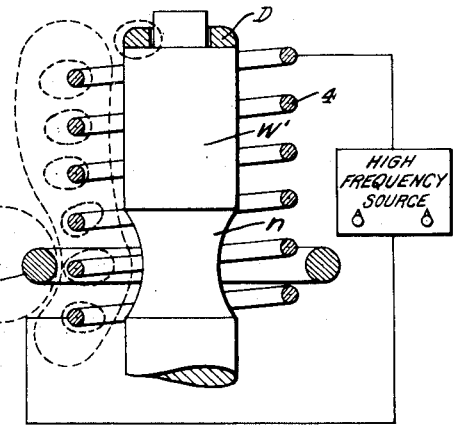
Fig. 2 is a similar view showing a desirable modification.

In Figure 2 of the drawing there is illustrated a desirable modification employing the general arrangement of Figure 1 for the surface heat treating of a work piece W' having a major body portion of uniform diameter and having a substantially reduced neck portion $n$ and which by reason of its particular form requires an inward deflection of the primary magnetic field for the proper heating of the inwardly deformed areas of reduced diameter. Accordingly, in the inductive heating arrangement therefor, with the employment of the uniform diameter heating coil, as shown, the compensating ring C for the production of the induced current and compensating flux field is arranged centrally positioned with relation to the portion of reduced area so as to deflect inwardly the heating flux field to be in the required coupling relation to the work for properly heating the neck portion surface layers. In this instance, the deflection of the flux lines of the heating field accommodates the lines of flow to the external contour of the work.

In addition thereto, in this modified arrangement there is associated with one extremity of the body of the work piece an annular member or ring of high electrical conductivity material to set up an induced current with the flux thereof having a corrective influence upon the normal path of flow of the magnetic flux of the heating coil. As indicated, this annular member, shown at D, bears upon the reduced shoulder or portion of the work piece and is formed at its innermost portion of larger cross-sectional area than that of its outer peripheral portion. The purpose thereof is to produce an induced counter magnetomotive force operative to deflect the flux lines of the primary coil field and to extend the extremity of the normal flux field in a manner to avoid non-uniform heating at the end portion of the work piece.

Figure 3:
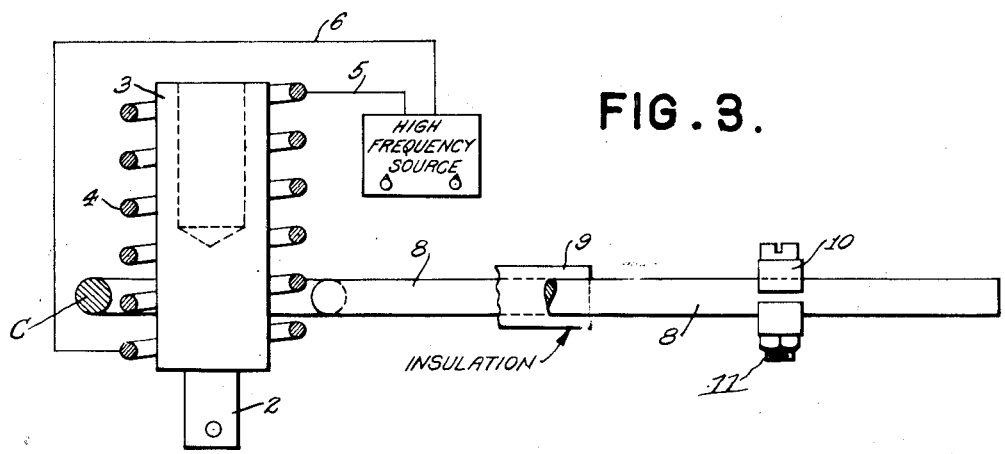
Figs. 3 and 4 are, respectively, vertical sectional and plan views of a further modification including means for varying the effective influence of the compensating coil.
Figure 4:
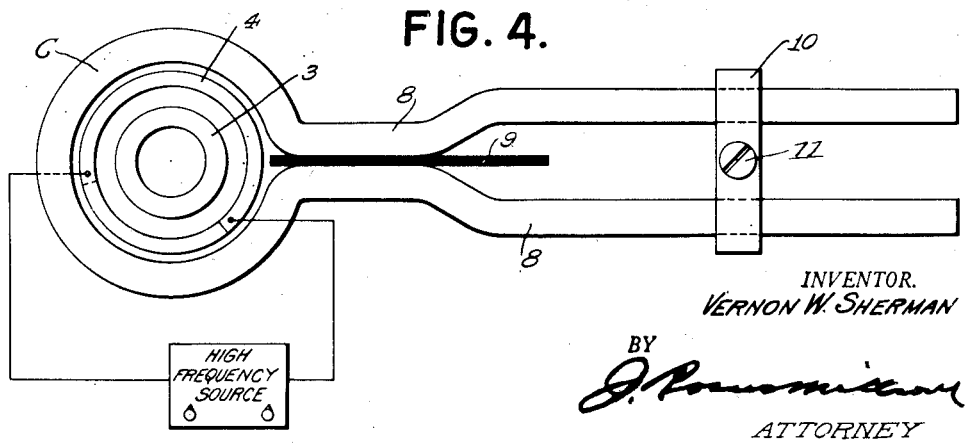

As will be appreciated, it may be desirable under certain circumstances to provide for adjustment of the controlling or corrective influence of the induced compensating circuit devised to meet specific changes in the form of the work pieces. To this end, I have shown in Figs. 3 and 4 a suitable modification wherein the compensating ring is of split form having laterally extended and parallel arm extensions 8—8 having interposed therebetween insulating material 9 and having slidably carried on their outer end portions a circuit closing bar 10 of yoke form secured by screw 11. The adjustment in the position of this bar on the arms 8 increases or decreases the effective length of the induced controlling circuit and thus by the altered impedance thereof alters its effect on or distortion of the primary heating field. This permits meeting specific conditions as required for hardening different sizes and sections of work.

The method and apparatus as disclosed is particularly advantageous in connection with the process of surface hardening of bearing shafts and the like with high frequency inductive heating employing currents of the order of radio frequency values. It permits of successfully controlling the flux path in the working areas so as to compensate for variations common in single coil heating of work of irregular section thereby to more accurately harden to the desired uniform depth throughout the length of the bearing area. While there is shown an arrangement employing a single controlling or compensating coil, it will be appreciated that multiple controlling coils may be employed as may be required by the specific variations in the work piece under treatment. Likewise while the conductor for the induced controlling circuit is shown as a circular section, the cross-sectional form thereof may be of other configuration or form which may prove effective in obtaining the desired distribution of the flux.

What is claimed is:

1. Induction heating apparatus for the surface hardening of work pieces of irregular section comprising a primary heating coil, means for energizing the coil with a high frequency current of the order of radio frequency value to effect the surface heating of work pieces positioned within the heating coil, a secondary compensating and closed circuit coil positioned externally of and encircling a portion only of the heating coil in such spaced relation thereto that the compensating circuit coil establishes a secondary flux field in controlling relation to the heating field operating to divert inwardly both the work threading and return flux lines of the heating field so as to adapt it to compensate for deviations of the heating field incident to the change in cross-section of the work.

2. Induction heating apparatus for the surface hardening of work pieces of irregular section comprising a primary heating coil, means for energizing the coil with a high frequency current of the order of radio frequency value to effect the surface heating of work pieces positioned within the heating coil, a single turn secondary, compensating and closed circuit coil positioned externally of and encircling a portion only of the heating coil inwardly of its ends and in spaced relation thereto, the compensating circuit coil being positioned to establish a secondary flux field in controlling relation to the heating field for diverting of the flux lines of the latter so as to adapt it to compensate for deviations of the heating field incident to the changes in cross-section of the work.

3. Induction heating apparatus for the surface hardening of work pieces of irregular section comprising a primary heating coil, means for energizing the coil with a high frequency current of the order of radio frequency value to effect the surface heating of work pieces positioned within the heating coil, a secondary compensating and closed circuit coil positioned externally of and encircling a portion only of the heating coil in such spaced relation thereto that the compensating circuit coil establishes a secondary flux field in controlling relation to the heating field operating to divert inwardly both the work threading and return flux lines of the heating field so as to adapt it to compensate for deviations of the heating field incident to the change in cross section of the work and said compensating coil having adjustable means operable to vary the impedance of the secondary circuit for altering of the controlling effect.

4. Induction heating apparatus adapted for surface hardening work pieces of irregular section comprising a primary heating coil for producing a magnetic flux field in coupled relation to the work for the heating thereof, means for energizing said coil at high frequency, and a secondary, controlling circuit coil member positioned whereby its flux field is in controlling coupled relation to the heating field, said secondary member being of substantially split ring form terminating in laterally extending separated arm portions and an adjustable secondary circuit closing bar carried by said arms and adjustable longitudinally thereof for altering the impedance of the controlling induced current to permit adjusting of the controlling effect thereof to compensate for changes in the counter magnetomotive forces incident to change in the cross-section of the work.

VERNON W. SHERMAN.